US007829256B2

(12) United States Patent
Fukushima (10) Patent No.: US 7,829,256 B2
(45) Date of Patent: Nov. 9, 2010

(54) PHOTOCURING COMPOSITION AND PLASMA DISPLAY PANEL PRODUCED BY USING THE SAME

(75) Inventor: Kazunobu Fukushima, Hiki-gun (JP)

(73) Assignee: Taiyo Ink Mfg. Co., Ltd., Tokyo (JP)

( * ) Notice: Subject to any disclaimer, the term of this patent is extended or adjusted under 35 U.S.C. 154(b) by 1094 days.

(21) Appl. No.: 11/518,182

(22) Filed: Sep. 11, 2006

(65) Prior Publication Data

US 2007/0065667 A1   Mar. 22, 2007

(30) Foreign Application Priority Data

Sep. 16, 2005   (JP) .............................. 2005-269669

(51) Int. Cl.
*H01J 9/02* (2006.01)
*H01J 9/227* (2006.01)
*G03F 7/004* (2006.01)

(52) U.S. Cl. .................... 430/198; 430/270.1; 430/319; 430/321; 313/484

(58) Field of Classification Search ........................ None
See application file for complete search history.

(56) References Cited

U.S. PATENT DOCUMENTS

| 6,555,594 | B1 * | 4/2003 | Fukushima et al. ........... 522/81 |
| 2006/0166113 | A1 * | 7/2006 | Lee et al. ....................... 430/7 |
| 2007/0040504 | A1 * | 2/2007 | Choi et al. .................. 313/567 |

FOREIGN PATENT DOCUMENTS

| JP | 2005-129319 |   | 5/2005 |
| JP | 2005-148233 | A * | 6/2005 |

OTHER PUBLICATIONS

Computer-generated translation of JP 2005-148233 (Jun. 2005).*

* cited by examiner

*Primary Examiner*—John A. McPherson
(74) *Attorney, Agent, or Firm*—Oblon, Spivak, McClelland, Maier & Neustadt, L.L.P.

(57) ABSTRACT

A photocuring composition includes black particles (A), black particles (B), an organic binder (C), a photopolymerizable monomer (D), and a photopolymerization initiator (E). The black particles (B) have a volume resistivity lower than the volume resistivity of the black particles (A) and an average diameter larger than the average diameter of the black particles (A).

34 Claims, 2 Drawing Sheets

PHOTOCURING COMPOSITION AND PLASMA DISPLAY PANEL PRODUCED BY USING THE SAME

CROSS-REFERENCE TO RELATED APPLICATIONS

The present application claims the benefit of priority to Japanese Patent Application No. 2005-269669, filed Sep. 16, 2005. The contents of this application are incorporated herein by reference in their entirety.

BACKGROUND OF THE INVENTION

1. Field of the Invention

The present invention relates to a photocuring composition, a black pattern structure formed by using the photocuring composition, a plasma display panel having the black pattern structure, and methods of producing the black pattern structure and the plasma display panel.

2. Discussion of the Background

The plasma display panel (hereinafter referred to as "PDP") is a planar display for exhibiting pictures and information by utilizing the light generated by plasma discharge and is classified under the DC or AC type, according to the panel structure and the driving mode. The principle of color display by the PDP is generating plasma discharge in cells (discharge spaces) separated by ribs (barriers) and formed between the opposing electrodes provided on a front substrate and a back substrate, and exciting the phosphor provided on the surface of the back substrate with ultraviolet light generated by the discharge of a gas such as He or Xe sealed in the cells, thereby generating visible lights of three primary colors. The cells in the DC type PDP are divided by the ribs of a lattice, whereas those in the AC type PDP are divided by the ribs arranged in parallel stripes.

Japanese Unexamined Patent Publication 2005-129319 describes a PDP with a front substrate having a transparent electrode and a bus electrode provided on the transparent electrode, and the bus electrode is formed of a black electrode and a white electrode positioned on the black electrode. The black electrode of this PDP is a thin film formed by using a photocuring composition containing black insulative particles. The blackness and conductivity of this black electrode are controlled by the thickness of the film. However, since these characteristics tend to conflict with each other, it is more difficult to attain enough blackness and ample conductivity in the black electrode at the same time. The contents of the above publication are incorporated herein by reference in their entirety.

SUMMARY OF THE INVENTION

According to one aspect of the present invention, a photocuring composition includes first black particles, second black particles, an organic binder, a photopolymerizable monomer and a photopolymerization initiator. The second black particles have a volume resistivity lower than that of the first black particles and an average diameter larger than that of the first black particles.

According to another aspect of the present invention, a black pattern structure for a plasma display panel includes a calcined body produced by calcining a photocuring composition, and the photocuring composition includes first black particles, second black particles, an organic binder, a photopolymerizable monomer and a photopolymerization initiator. The second black particles have a volume resistivity lower than that of the first black particles and an average diameter larger than that of the first black particles.

According to yet another aspect of the present invention, a plasma display panel includes a substrate and one or more black pattern structures formed on the substrate. The black pattern structures include a calcined body produced by calcining a photocuring composition including first black particles, second black particles, an organic binder, a photopolymerizable monomer and a photopolymerization initiator. The second black particles have a volume resistivity lower than that of the first black particles and an average diameter larger than that of the first black particles.

According to yet another aspect of the present invention, in a method of producing a black pattern structure for a plasma display panel, a photocuring composition is prepared, a film comprised of the photocuring composition is formed on a substrate, the film is subjected to a light exposure through a patterned mask, developed to remove an unexposed portion of the film, and calcined to produce a patterned film. The photocuring composition includes first black particles, second black particles, a photopolymerizable monomer, and a photopolymerization initiator. The second black particles have a volume resistivity lower than that of the first black particles and an average diameter larger than that of the first black particles.

According to yet another aspect of the present invention, in a method of producing a plasma display panel, a substrate is provided and one or more black pattern structures are formed on the substrate. In forming the black pattern structures, a photocuring composition is prepared, a film comprised of the photocuring composition is formed on a substrate, and the film is subjected to a light exposure through a patterned mask, developed to remove an unexposed portion of the film, and calcined to produce a patterned film. The photocuring composition includes first black particles, second black particles, a photopolymerizable monomer, and a photopolymerization initiator. The second black particles have a volume resistivity lower than that of the first black particles and an average diameter larger than that of the first black particles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
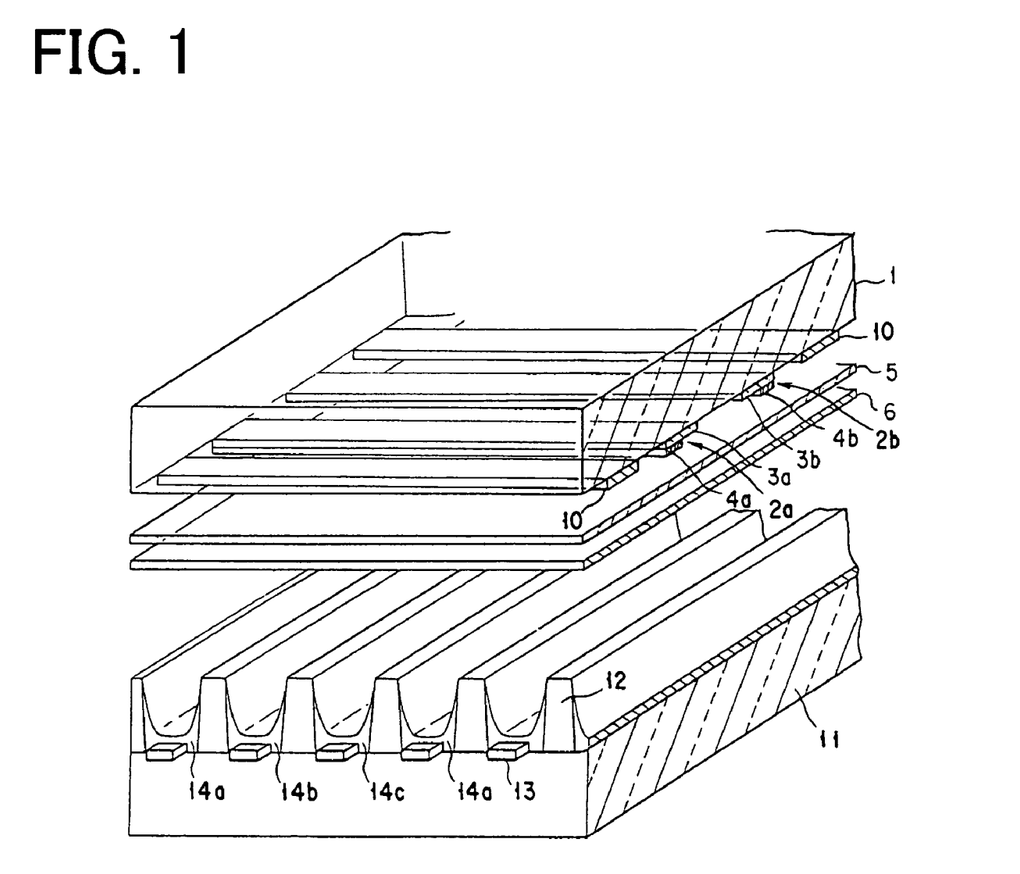
FIG. 1 is an exploded perspective view of a plasma display panel according to one embodiment of the present invention.

FIG. 1 is an exploded perspective view of a PDP according to one embodiment of the present invention. As an example, FIG. 1 shows a surface discharge PDP having a three-electrode structure for full color display. Referring to FIG. 1, a PDP 20 includes a front substrate 1 and a back substrate 11 positioned to face the front substrate 1. For example, the front substrate 1 and back substrate 11 are made of glass. The front substrate 1 has a surface (lower surface in FIG. 1) on which a pair of display electrodes (2a, 2b) are provided with a predetermined pitch. The display electrode (2a) is formed of a transparent electrode (3a) and a bus electrode (4a) provided on the transparent electrode (3a). Similarly, the display electrode (2b) is formed of a transparent electrode (3b) and a bus electrode (4b) provided on the transparent electrode (3b). The transparent electrodes (3a, 3b) produce the discharge, and the bus electrodes (4a, 4b) are provided for lowering the line resistance of the transparent electrodes (3a, 3b), respectively. A transparent dielectric layer 5 which accumulates electric charges is formed on the display electrodes (2a, 2b). As an example, the transparent dielectric layer 5 is made of glass having a low melting point and formed by printing and calcination. A protective layer 6 is formed on the transparent dielectric layer 5, and protects the display electrodes (2a, 2b) and maintains the state of discharge. The protective layer 6 is, for instance, made of MgO and formed by vacuum deposition. On the back substrate 11, ribs (barriers) 12 are provided in stripes and define discharge spaces. Also, address electrodes (data electrodes) 13, each disposed in the discharge spaces, are laid out with prescribed pitches. On the inner face of each discharge space, phosphor films (14a, 14b, 14c) for the three primary colors, red (14a), blue (14b) and green (14c), are regularly formed. In the full color display, the phosphor films of these three primary colors jointly form one pixel.

Further, on both sides of the display electrode (2a, 2b), black stripes 10 are provided for enhancing contrast of the displayed images. The black stripes 10 are laid between each pair of display electrodes (2a, 2b) positioned side by side, and insulate between each pair of the display electrodes (2a, 2b).

The PDP 20 described above is a surface discharge PDP because an AC pulse voltage is applied between the pair of display electrodes (2a, 2b) to generate discharge between the electrodes on the same substrate.

In the above PDP 20, ultraviolet light produced by the discharge excites the phosphor films (14a, 14b, 14c) formed on the back substrate 11, and visible light generated by the phosphor films (14a, 14b, 14c) is observed through the transparent electrodes (3a, 3b) on the front substrate 1.

Figure 2A:
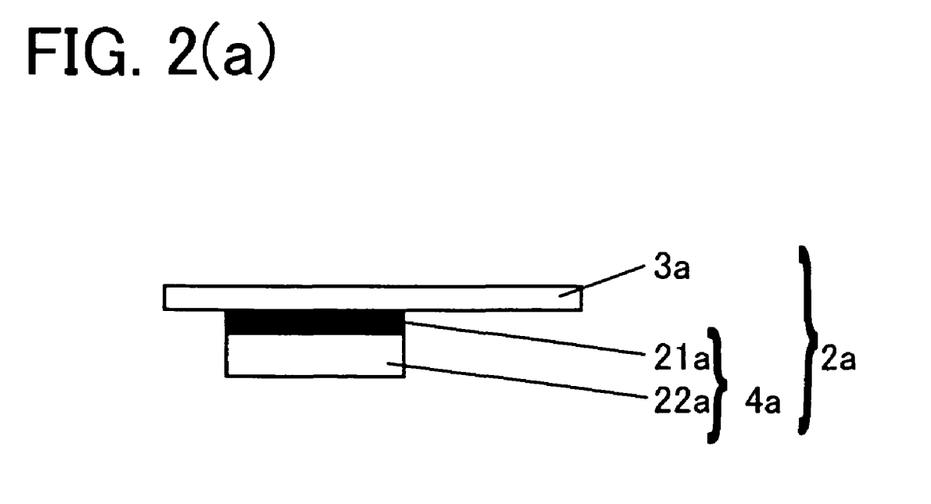
FIG. 2(a) is a cross-sectional view of a display electrode (2a) of the plasma display panel.
Figure 2B:
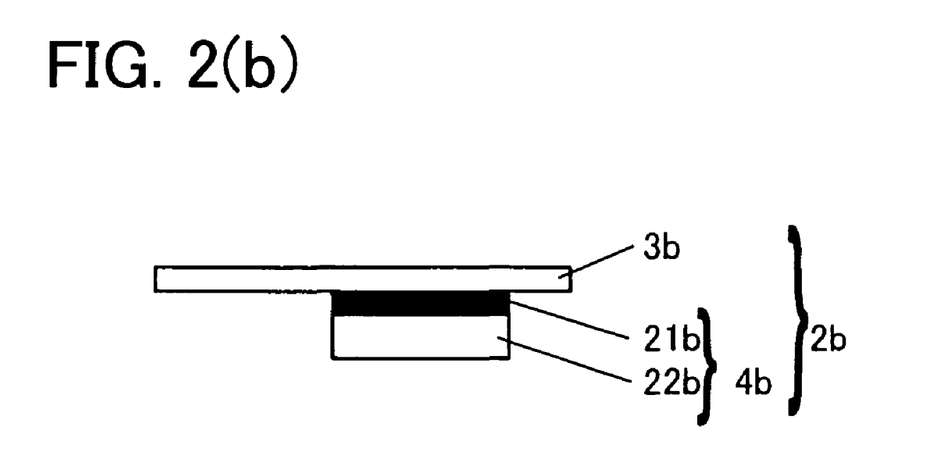
FIG. 2(b) is a cross-sectional view of a display electrode (2b) of the plasma display panel.

FIGS. 2(*a*) and 2(*b*) are cross-sectional views of the display electrodes (2a) and (2b), respectively. In reference to FIGS. 2(*a*) and 2(*b*), the structures of the display electrodes (2a, 2b) and bus electrodes (4a, 4b) are described. As discussed above, the display electrodes (2a, 2b) are formed of the bus electrodes (4a, 4b) and transparent electrodes (3a, 3b), respectively. As illustrated in FIG. 2(*a*), the bus electrode (4a) has a black layer (21a) and a white layer (22a), and the black layer (21a) is provided between the transparent electrode (3a) and the white layer (22a). Likewise, as shown in FIG. 2(*b*), the bus electrode (4b) has a black layer (21b) and a white layer (22b), and the black layer (21b) is provided between the transparent electrode (3b) and the white layer (22b). Since the bus electrodes (4a, 4b) have such back layers (21a, 21b), the contrast of the PDP 20 is enhanced.

The black layers (21a, 21b) are produced by using a photocuring composition according to one embodiment of the present invention, as explained in more detail. The black stripes 10 of the PDP 20 are also produced by using the same photocuring composition. The photocuring composition of the present embodiment allows the black layer (21a or 21b) to have ample vertical conductivity between the transparent electrode (3a or 3b) and the white layer (22a or 22b), and also allows the black stripes 10 to provide sufficient insulation between each pair of the display electrodes (2a, 2b) positioned side by side.

A photocuring composition for forming a black pattern structure on a substrate of a PDP will be described below. The term "black pattern structure" is used to mean black or dark-colored, patterned layers and films formed in a PDP, including black layers (21a, 21b) and black stripes 10 discussed above, and the black pattern structure "formed on" the substrate means that the black pattern structure is formed simply above the substrate and that the black pattern structure may or may not be in contact with the substrate.

The photocuring composition according to one embodiment of the present invention includes two types of black particles (A) and (B) which differ in the volume resistivity and average diameter. The volume resistivity of black particles (A) (first black particles) is higher than that of black particles (B) (second black particles), and is preferably in the range of $1.0 \times 10^6$ and $1.0 \times 10^{16}$ Ω·cm. If the volume resistivity is lower than $1.0 \times 10^6$ Ω·cm, black stripes formed using that composition may erroneously discharge electricity.

The average diameter of the black particles (A) is smaller than that of black particles (B), and is preferably in the range of 0.3 and 0.01 μm. If the average diameter exceeds 0.3 μm, the calcined film made thereof becomes coarse and the blackness of the film tends to be lower. On the other hand, if the average diameter is smaller than 0.01 μm, the fluidity of the paste may be lower. The term "average diameter" is used to mean a median diameter (D50) that can be measured by, e.g., a particle distribution measuring device employing a laser light diffraction method or a particle size analyzer employing a laser Doppler method.

The photocuring composition of the present embodiment further includes an organic binder (C). The black particles (A) are included in the range of 20 and 300 parts by mass, based on 100 parts by mass of the organic binder (C), preferably in the range of 50 and 200 parts by mass. If the amount of the black particles (A) is less than the above range, sufficient blackness may not be attained after calcination, and if the amount exceeds the above range, light transmittivity may become worse.

Examples of black particles (A) with a preferred volume resistivity in the range of $1.0 \times 10^6$ and $1.0 \times 10^{16}$ Ω·cm, include but are not limited to: oxides and complex oxides of Al, Be, Ce, Cr, Hf, Mg, Si, Th, Ti, Zr, and Co. These components can be selected either singly or in combination of two or more.

The volume resistivity of black particles (B) is lower than that of the black particles (A), and is preferably in the range of $1.0 \times 10^{-6}$ and $1.0 \times 10^4$ Ω·cm. If the volume resistivity exceeds $1.0 \times 10^4$ Ω·cm, the black layer of the bus electrode formed after calcination may not attain sufficient conductivity between the layers positioned below and above the black layer.

The average diameter of the above black particles (B) is larger than that of black particles (A), and is preferably in the range of 0.6 and 2.0 μm. If the average diameter is smaller than 0.6 μm, the black layer of the bus electrode produced after the calcination may not achieve sufficient interlayer conductivity. On the other hand, if the average diameter exceeds 2.0 μm, black particles (B) may cause ragged lines.

Examples of black particles (B) with a lower volume resistivity as described above, include, but are not limited to: oxides and complex oxides of Cr, Fe, Ir, Mn, Mo, Nb, Os, Pt, Re, Rh, Ru, Ti, Cu, Ni, La, Sr, and Co. These components may be selected either singly or in combination of two or more.

When combining the two types of black particles (A) and (B) in the composition of the present embodiment, the amount of the above black particles (B) with a lower resistivity to be incorporated in the composition preferably falls in the range of 10 and 120 parts by mass, based on 100 parts by mass of the aforementioned black particles (A) with a higher resistivity. If the amount of black particles (B) is less than the above range, the black layer of the bus electrode formed after calcination may not attain sufficient conductivity between layers. On the other hand, if the amount exceeds the above range, the black stripe may erroneously discharge electricity.

The "blackness" of the black particles (A) with a higher volume resistivity and black particles (B) with a lower volume resistivity is the blackness which registers 5 or less on the Munsell value scale, or has a L* value of 50 or less on the L*a*b* color system scale.

As for the above-mentioned organic binder (C), a resin containing carboxyl group, specifically, a photosensitive resin containing carboxyl group, either with or without ethylenically unsaturated double bond, may be selected. Such a photosensitive resin containing carboxyl group and a resin containing carboxyl group may be used either singly or in combination. In either case, the preferred amount of the resin is in the range of 10 and 80% by mass of the entire composition. If the amount of the resin is smaller than the above percentage, the distribution of the resin in the film formed thereof tends to be uneven. Consequently, photocuring to a sufficient degree and depth may be hard to achieve and patterning the film through selective exposure and development may also be difficult to conduct. On the other hand, if the amount exceeds the above percentage, warpage or shrinkage of line width may occur at the time of calcining the composition.

The above-mentioned photosensitive resin containing carboxyl group and the resin containing carboxyl group suitable for the organic binder (C) have a weight-average molecular weight in the range of 1,000 and 100,000, preferably between 5,000 and 70,000, and the preferred acid value is in the range of 50 and 250 mg KOH/g. Further, when using a photosensitive resin containing carboxyl group, its double bond equivalent is in the range of 350 and 2,000 g/equivalent, preferably in the range of 400 and 1,500 g/equivalent. If the volume-average molecular weight of the resin is less than 1,000, adhesiveness of the film may be adversely affected while developing. On the other hand, the volume-average molecular weight exceeding 100,000 may result in poor development. If the acid value is less than 50 mg KOH/g, its solubility in alkaline solution is insufficient, causing poor development results. If the acid value exceeds 250 mg KOH/g, the adhesiveness of the resultant film may be impaired or the photocured portion (exposed portion) may dissolve in the developing process. Further, in a photosensitive resin containing carboxyl group, if the double bond equivalent of the photosensitive resin is less than 350 g/equivalent, residue tends to remain after calcination. If its double bond equivalent exceeds 2,000 g/equivalent, workability of the developing process may be lower and a large amount of light exposure may be necessary during the photocuring process.

The photocuring composition of the present embodiment also includes a photopolymerizable monomer (D) so as to enhance the photocurability and improve the developability of the composition. Examples of photopolymerizable monomers include, but are not limited to: 2-hydroxyethyl acrylate, 2-hydroxypropyl acrylate, diethyleneglycol diacrylate, triethyleneglycol diacrylate, polyethyleneglycol diacrylate, polyurethane diacrylate, 1,4-butandiol diacrylate, 1,6-hexanediol diacrylate, tricyclodecane dimethanol diacrylate, trimethylolpropane triacrylate, pentaerythritol triacrylate, pentaerythritol tetraacrylate, trimethylolpropane ethylene oxide-modified triacrylate, trimethylolpropane propylene oxide-modified triacrylate, dipentaerythritol pentaacrylate, dipentaerythritol hexaacrylate, and methacrylates corresponding to the acrylates enumerated above; and mono-, di-, tri-, or higher polyesters of hydroxyalkyl(meth)acrylatepolybasic acids such as phthalic acid, adipic acid, maleic acid, itaconic acid, succinic acid, trimellitic acid, and terephthalic acid. These components may be used either singly or in combination of two or more. Among the above-enumerated photosensitive monomers, multifunctional monomers containing two or more acryloyl groups or methacryloyl groups in one molecule are preferred.

The amount of the aforementioned photopolymerizable monomer (D) to be incorporated in the composition suitably falls in the range of 20 and 120 parts by mass, based on 100 parts by mass of the organic binder (C) (photosensitive resin containing carboxyl group and/or resin containing carboxyl group). If the amount of photopolymerizable monomer (D) is lower than the above range, the resultant composition may not attain sufficient photocurability. On the other hand, if the amount is higher than the above range, the curing speed on the surface becomes faster than that at depth, thus possibly causing uneven photocuring.

In addition, the photocuring composition of the present embodiment includes a photopolymerization initiator (E). Examples of the photopolymerization initiator (E) include, but are not limited to: benzoin and benzoin alkyl ethers such as benzoin, benzoin methyl ether, benzoin ethyl ether, and benzoin isopropyl ether; acetophenones such as acetophenone, 2,2-dimethoxy-2-phenylacetophenone, 2,2-diethoxy-2-phenylacetophenone, and 1,1-dichloroacetophenone; amino acetophenones such as 2-methyl-1-[4-(methylthio)phenyl]-2-morpholinopropane-1-one, 2-benzyl-2-dimethylamino-1-(4-morpholinophenyl)-butanone-1, and 2-(dimethylamino)-2-[(4-methylphenyl)methyl]-1-[4-(4-morpholinyl)phenyl]-1-butanone; anthraquinones such as 2-methylanthraquinone, 2-ethylanthraquinone, 2-t-butylanthraquinone, and 1-chloroanthraquinone; thioxanthones such as 2,4-dimethylthioxanthone, 2,4-diethylthioxanthone, 2-chlorothioxanthone, and 2,4-diisopropylthioxanthone; ketals such as acetophenone dimethyl ketal, and benzyl dimethyl ketal; benzophenones; xanthones; phosphine oxides such as (2,6-dimethoxybenzoyl)-2,4,4-pentylphosphine oxide, bis(2,4,6-trimethylbenzoyl)-phenylphosphine oxide, 2,4,6-trimethylbenzoyldiphenylphosphine oxide, and ethyl-2,4,6-trimethylbenzoylphenyl phosphinate; and various peroxides. These photopolymerization initiators may be used either singly or in combination of two or more.

The amount of the photopolymerization initiator (E) to be incorporated in the composition falls in the range of 1 and 30 parts by mass, based on 100 parts by mass of the organic binder (C). The preferred range is 5 and 20 parts by mass.

The above-described photopolymerization initiator (E) may be used in combination with one or more photosensitizers. Examples of such photosensitizers include, but are not limited to: tertiary amines such as N,N-dimethylaminobenzoic acid ethyl ester, N,N-dimethylaminobenzoic acid isoamyl ester, pentyl-4-dimethylamino benzoate, triethylamine, and triethanol amine.

Further, when photocuring at a much deeper level is desired, a titanocene type photopolymerization initiator, manufactured and sold by Ciba Specialty Chemicals, Inc. under the trademark "IRGACURE 784," which initiates radical polymerization in the visible region, or leuco dye, etc. may be combined and used as a curing aid.

If desired, glass powder (F) having a softening point in the range of 400 and 600° C. may be incorporated in the present photocuring composition, in an amount so as not to harm the characteristics of this photocuring composition. To improve adhesion to conductive circuits after calcination of the composition, the amount of glass powder (F) to be added to the composition is 400 parts or less by mass, preferably 200 parts or less, based on 100 parts by mass of black particles (A). If the amount is higher than the above range, the resultant interlayer conductivity in the black layer of the bus electrode having the black layer and white layer may be insufficient after calcination. Preferred glass powder has a glass transition point (Tg) in the range of 300 and 500° C., and a glass softening point (Ts) in the range of 400 and 600° C. If the softening point of glass powder is lower than 400° C., it tends to wrap organic binder, and the remaining organic binder is decomposed, leaving behind residual blisters in the composition. To achieve good resolution, the average particle diameter for the glass powder to be incorporated is 10 μm or smaller, preferably 3 μm or smaller.

Examples of glass powder mentioned above include non-crystalline frit including lead oxide, bismuth oxide, zinc oxide or other material as a main component.

When a large amount of inorganic powder is mixed into the photocuring composition of the present embodiment, the resultant composition may not have sufficient stability for storage, and the coating process may be difficult due to gelling or lower fluidity of the composition. Therefore, compounds capable of forming a complex or salt with components of the inorganic powder, such as metal or oxide powder, may be added as stabilizers to the photocuring composition. Examples of the stabilizers include acids including, but are not limited to: inorganic acids such as nitric acid, sulfuric acid, hydrochloric acid, and boric acid; organic acids such as formic acid, acetic acid, acetoacetic acid, citric acid, stearic acid, maleic acid, fumaric acid, phthalic acid, benzenesulfonic acid, and sulfamic acid; phosphoric acid compounds (inorganic phosphoric acid and organic phosphoric acid) such as phosphoric acid, phosphorous acid, hypo-phosphorous acid, methyl phosphate, ethyl phosphate, butyl phosphate, phenyl phosphate, ethyl phosphite, diphenyl phosphite, and mono(2-methacryloyloxyethyl)acid phosphate. The above compounds may be used either singly or in combination of two or more.

In the present embodiment, an organic solvent may be added in a proper amount so as to dilute the composition and form a paste, which makes the coating process easier, and subsequently dry the coated paste to form a film which is then subjected to contact light exposure. Examples of the organic solvent include, but are not limited to: ketones such as methylethylketone and cyclohexanone; aromatic hydrocarbons such as toluene, xylene, and tetramethyl benzene; glycol ethers such as cellosolve, methyl cellosolve, carbitol, methyl carbitol, butyl carbitol, propylene glycol monomethyl ether, dipropylene glycol monomethyl ether, dipropylene glycol monoethyl ether, and triethylene glycol mono-ethyl ether; esters such as ethyl acetate, butyl acetate, cellosolve acetate, butyl cellosolve acetate, carbitol acetate, butyl carbitol acetate, propylene glycol monomethyl ether acetate, and 2,2,4-trimethyl-1,3-pentanediol monoisobutylate; alcohols such as ethanol, propanol, ethylene glycol, propylene glycol, and terpineol; aliphatic hydrocarbons such as octane and decane; petroleum solvents such as petroleum ether, petroleum naphtha, hydrogenated petroleum naphtha, and solvent naphtha; and 2,2,4-trimethyl-1,3-pentanediol monoisobutylate. These compounds may be used either singly or in combination of two or more.

Further, in the present embodiment, various additives such as a silicone type or acrylic type antifoaming/leveling agent, a silane coupling agent to improve the adhesiveness in the coating film, a cationic, anionic, or nonionic pigment disperser, and the like, may be incorporated in the photocuring composition for the intended use. Furthermore, the composition may also include antioxidants, anti-thermal polymerization agents to obtain increase thermal stability while preserving, and other components for adhesion to the substrate in the calcination process such as metal oxide, silicon oxide, boron oxide, or other fine particles.

If the photocuring composition of the present embodiment has been made into a film in advance, the film can be laminated onto the substrate. If the composition is a paste, it is coated on the substrate, for example, a glass substrate of the PDP, by a proper coating method such as the screen printing technique, bar coater, or blade coater, then dried at a temperature in the approximate range of 60 and 120° C. for about 5 and 40 minutes in a hot-air-circulating drying oven or in a far-infrared drying oven to evaporate the organic solvent used therein, subsequently producing a good tack-free film. Then, suitable electrical circuits and black pattern structures are formed through selective exposure, development, and calcination.

The film is exposed to light either by a contact light exposure or a non-contact light exposure, using a negative mask adapted to form a prescribed pattern. A halogen lamp, a high-pressure mercury lamp, a laser beam, a metal halide lamp or a no electrode lamp may be used as a light source to subject the film to an exposure in the amount preferably between about 50 and 1,000 mJ/cm$^2$.

The exposed composition is developed by using a spray technique, an immersion technique or the like. Examples of developers include: aqueous alkaline solutions of metals such as sodium hydroxide, potassium hydroxide, sodium carbonate, potassium carbonate, and sodium silicate; and aqueous amine solutions such as monoethanol amine, diethanol amine, and triethanol amine. In particular, a dilute aqueous alkaline solution of less than 1.5% by mass is preferred, but the developing solution is not limited to the above examples, as long as the carboxyl group in the resin is saponified and the uncured portions (unexposed portions) are removed. After developing, it is preferred to wash or acid neutralize the film to remove the remaining developer.

To obtain the intended pattern, the developed film is calcined in an air or nitrogen atmosphere at a temperature in the approximate range of 400 and 620° C.

The preferred film thickness of the black pattern structures after calcination is in the range of 0.3 and 2.0 μm. If the calcined film is thinner than the above range, it may be difficult to attain the blackness for enhancing the contrast of the display, and if the film is thicker than the above range, it may be difficult to retain enough conductivity in the black layer of the bus electrode having the black layer and the white layer.

The present embodiment will be described more specifically with reference to working examples below. The present invention is not limited to the following examples. Wherever "parts" are mentioned hereinbelow, they refer to those based on mass unless otherwise specified.

Table 1 shows black particles used in the examples. As described below, those black particles, an organic binder and a glass powder with a low melting point were used to prepare a photosensitive conductive paste for the upper layer (white layer), compositions for the lower layer (black layer) according to Examples 1-3 and Comparative Examples 1-2 were prepared. Each composition was mixed using a blender, and kneaded in a three-roll mill, to obtain test pastes.

TABLE 1

| | volume resistivity | average diameter | L value | material |
|---|---|---|---|---|
| black particles (A-1) | $3.9 \times 10^6 \, \Omega \cdot cm$ | 0.15 μm | 11.89 | tricobalt tetroxide |
| black particles (B-1) | $7.5 \times 10^3 \, \Omega \cdot cm$ | 0.98 μm | 28.47 | Nickel |
| black particles (B-2) | $1.9 \times 10^4 \, \Omega \cdot cm$ | 0.71 μm | 17.88 | LaSrCoO |
| black particles (B-3) | $1.1 \times 10^4 \, \Omega \cdot cm$ | 0.10 μm | 5.71 | CuFeMn |

The volume resistivity of the black particles was calculated with the following process: put 3 g of black particles in fine powdery form into a cylinder (resin cylinder, Φ 20 mm), held the cylinder vertically between aluminum columns (Φ 20 mm), added 100 kgf/cm² pressure, measured the resistance after 30 seconds with a tester, measured the thickness of the pressured particles with a pair of vernier micrometers, and calculated volume resistivity based on the equation below. The temperature was 23° C.

volume resistivity($\rho$)($\Omega \cdot cm$)=cross-sectional area($a$) (cm²)×resistance($R$)($\Omega$)/thickness($l$)(cm)

The average diameter (D50) was measured by a particle distribution measuring device employing a laser light diffraction method or a particle size analyzer using laser Doppler method (MICROTRAC).

The L* value was measured as follows: put 3 g of the black particles in fine powdery form between glass plates, measured brightness value L* on the L*a*b*color system scale using a colorimeter ("CR-221" manufactured by Minolta Camera K.K.) according to JIS-Z-8729, and recorded each L* value as a blackness index. The smaller the L* value, the better the black index. The contents of JIS-Z-8729 (published by Japanese Standards Association) are incorporated herein by reference in their entirety.

The organic binder used below was a resin containing carboxyl PB-383 (Tg=63° C., acid value=176 mg KOH/g, volume-average molecular weight=26,000, Mitsubishi Rayon Co., Ltd.), which was dissolved in terpineol to make the solid portion 35 wt. %. The glass powder with a low melting point used below contained $Bi_2O_3$ 50%, $B_2O_3$ 15%, ZnO 15%, $SiO_2$ 6%, BaO 17%, and was crushed to make a powder having a thermal expansion coefficient α300 of $85 \times 10^{-7}$/° C., a glass transition point of 460° C., and an average particle diameter of 1.6 μm.

<Photosensitive Conductive Paste for the White Layer (Upper Layer)>

The photosensitive conductive paste for the upper layer includes the following:

| | |
|---|---|
| organic binder | 285.7 parts |
| trimethylolpropane triacrylate | 90.0 parts |

2-methyl-1-[4-(methylthio)phenyl]

| | |
|---|---|
| 2-morpholinopropane-1-one | 15.0 parts |
| dipropylene glycol monomethyl ether | 20.0 parts |
| silver powder | 500.0 parts |
| glass powder with a low melting point | 35.0 parts |
| defoaming/leveling agent | 6.0 parts |

XL490; Itoh Oil Chemicals Co., Ltd.)

<Photosensitive Paste for the Black Layer (Lower Layer)>

The photosensitive pastes for the black layer according to Examples 1-3 and Comparative Examples 1 and 2 include the following:

Example 1

| | |
|---|---|
| organic binder | 285.7 parts |
| trimethylolpropane triacrylate | 90.0 parts |

2-methyl-1-[4-(methylthio)phenyl]

| | |
|---|---|
| 2-morpholinopropane-1-one | 15.0 parts |

2,2,4-trimethyl-1,3-pentanediol

| | |
|---|---|
| monoisobutylate | 40.0 parts |
| black particles A-1 | 50.0 parts |
| black particles B-1 | 10.0 parts |
| glass powder with a low melting point | 10.0 parts |
| stabilizing agent | 1.0 parts |
| defoaming/leveling agent | 6.0 parts |

(XL490; Itoh Oil Chemicals Co., Ltd.)

Example 2

The same composition as Example 1, except black particles B-1 were replaced with black particles B-2.

Example 3

The same composition as Example 2, except the proportion of black particles B-2 were 50 parts.

Comparative Example 1

The same composition as Example 1, except black particles B-1 were removed.

Comparative Example 2

The same composition as Example 1, except black particles B-1 were replaced with black particles B-3.

Each test paste prepared using the above-described compositions of Examples 1-3 and Comparative Examples 1 and 2 was evaluated for properties such as conductivity between the white layer and ITO, insulation at the black single layer, blackness (L value) at the black and white dual layers, blackness at the black single layer (L value), and thickness of the black single layer after calcination.

The evaluation methods used therein are described below.

<Interlayer Conductivity>

The test paste was applied to the entire top face of a glass substrate on which an ITO film is provided by the use of a 200-mesh polyester screen and was dried in a hot-air-circulating drying oven at 90° C. for 25 minutes to form a good tack-free film. After the film was subjected to light exposure to apply an accumulated light amount of 900 mJ/cm$^2$ to the composition by using a high-pressure mercury lamp as a light source, a conductive paste for the white layer was applied to the entire surface of the exposed film by using a 200-mesh polyester screen, and was dried in a hot-air-circulating drying oven at 90° C. for 25 minutes to give a good tack-free touch to the resultant dual-layered film. By using a negative mask adapted to form a pair of lines 4 mm×100 mm, separated by a 5 mm space, the dual-layered film was exposed to a calculated dose of 500 mJ/cm$^2$, developed with an aqueous 0.5 wt. % Na$_2$CO$_3$ solution (solution temperature 30° C.), and then washed. Lastly, the temperature of the developed film was raised at 5° C./minute, and the film was calcined at 600° C. for 5 minutes to form the substrate.

The insulation resistance of each pair of lines formed herein was measured by applying the probes of a tester (3540 mΩ HITESTER, manufactured by HIOKI E.E. CORPORATION).

<Insulation>

The test paste was applied to the entire top face of a glass substrate by the use of a 200-mesh polyester screen and was dried in a hot-air-circulating drying oven at 90° C. for 25 minutes to give a good tack-free touch to the film. After the film was subjected to light exposure to apply an accumulated amount of 900 mJ/cm$^2$ to the composition by using a high-pressure mercury lamp as a light source, a conductive paste for the white layer was applied to the entire surface of the exposed film by the use of a 200-mesh polyester screen, and was dried in a hot-air-circulating drying oven at 90° C. for 25 minutes to give a good tack-free touch to the resultant dual-layered film. By using a negative mask adapted to form a pair of lines 4 mm×100 mm, separated by a 5 mm space, the dual-layered film was subjected to light exposure to apply an accumulated light amount of 500 mJ/cm$^2$ to the composition, developed with an aqueous 0.5 wt. % Na$_2$CO$_3$ solution (solution temperature 30° C.), and then washed. Lastly, the temperature of the developed film was raised at 5° C./minute, and the film was calcined at 600° C. for 5 minutes to form the substrate.

The insulation resistance of each pair of lines formed herein was measured by applying the probes of an insulation resistance meter (R8340A ULTRA HIGH RESISTANCE METER manufactured by ADVANTEST CORPORATION, application voltage 500V, value at 60 seconds).

<L* Value>

The brightness index L* value of the film, whose conductivity and insulation were tested above, was measured on the L*a*b* color scale by using a colorimeter ("CR-221" manufactured by Minolta Camera K.K.) according to JIS-Z-8729, and the L* value obtained was evaluated as a black index. The smaller the L* value, the higher the degree of blackness.

<Thickness of the Calcined Film>

The thickness of the aforementioned test film was measured by a surface roughness meter ("SE-30H" manufactured by Kosaka Laboratory Ltd.). The test results are shown in Table 2.

TABLE 2

|  | Examples | | | Comparative Examples | |
| --- | --- | --- | --- | --- | --- |
|  | 1 | 2 | 3 | 1 | 2 |
| conductivity between layers (Ω) | 6.41 | 6.82 | 5.98 | 12.23 | 8.92 |
| insulation (Ω) | $1.63 \times 10^8$ | $1.16 \times 10^9$ | $6.99 \times 10^8$ | $1.12 \times 10^9$ | $2.24 \times 10^6$ |
| blackness (L value, bus electrode) | 16.69 | 16.65 | 17.11 | 16.98 | 16.78 |
| blackness (L value, single black layer) | 17.20 | 17.71 | 17.66 | 15.23 | 16.82 |
| thickness of calcined film at single black layer (μm) | 1.0 | 1.0 | 1.5 | 1.0 | 1.3 |

As shown in Table 2, compared with the pastes made using the compositions of Comparative Examples 1-2, the test pastes made using the compositions of Examples 1-3 produced a lower layer (black layer) of a bus electrode with sufficient conductivity between layers, and also produced a single black layer (black stripe) with sufficient insulation between display electrodes while achieving sufficient blackness.

The line formation after development, and the line formation and line resistance after calcination of the aforementioned test pastes, were also evaluated and good results were obtained. The test methods are as follows.

The test paste was applied to the entire top face of the glass substrate by the use of a 200-mesh polyester screen and was dried in a hot-air-circulating drying oven at 90° C. for 25 minutes to produce a good tack-free film. Then, a conductive paste for the white layer was applied to the entire surface of the exposed film by the use of a 200-mesh polyester screen, and was dried in a hot-air-circulating drying oven at 90° C. for 25 minutes to give a good tack-free touch to the resultant dual-layered film.

Then, by using a negative mask adapted to form lines at line/space=100/100 μm, the dual-layered film formed herein was subjected to light exposure to apply an accumulated light amount of 500 mJ/cm$^2$ to the composition, developed using a 0.5 wt. % Na$_2$CO$_3$ solution (solution temperature 30° C.), and then washed. Finally, the temperature of the developed film was raised at 5° C./minute, and the film was calcined at 600° C. for 5 minutes to form a substrate.

The patterns on the test substrate were examined using a microscope whether the irregular lines or twisted lines were produced. Neither the lines before calcination nor those after calcination showed any irregularities or twists.

As discussed above, the photocuring composition according to the present embodiment includes black particles with a higher-volume resistivity and another type of black particles with a larger diameter and a lower-volume resistivity as black pigments. A black film formed by using that composition is capable of carrying sufficient vertical conductivity and parallel insulation at the same time. Consequently, by using the photocuring composition, the black layers of the bus electrodes achieve enough interlayer conductivity and blackness to enhance the contrast of the display panel, and the black stripe realizes enough insulation between each pair of display electrodes positioned side by side.

In addition, the PDPs using the photocuring composition of the present embodiment can be mass-produced at a lower cost, since both the black layers of the bus electrodes and the black stripes can be made with the same material to simplify the production process as described earlier. Therefore, this process provides advantages over other manufacturing methods which form bus electrodes by building three layers of Cr—Cu—Cr by vacuum deposition or spattering, and then patterning the layers using a photolithograpic technique. This process contains numerous steps and consequently causes high production costs.

According to the present embodiment, the photocuring composition is capable of attaining sufficient conductivity at the black layer of the dual-layered bus electrode without sacrificing the blackness for enhancing the contrast of the display panel, and at the same time capable of securing ample insulation of the black stripe layer between each pair of display electrodes which are positioned side by side. Therefore, by using the photocuring composition of the present embodiment, the contrast of the display panel is improved compared to the panels having a bus electrode formed simply by screen printing a conductive paste such as silver paste and then calcining the layers, or by applying a photosensitive conductive paste, exposing the layer of paste to light through a pattern mask, developing the exposed layer, and then calcining the developed layer to obtain a pattern of a narrower line width, for example, 150 μm or less.

Furthermore, the PDP of the present embodiment has highly efficient electric circuits and black pattern structures using the above-mentioned photocuring composition. More specifically, the PDP has a front substrate wherein the lower layers (black layers) of the dual-layered bus electrodes have sufficient blackness and conductivity between the layers (i.e., conductivity between the transparent electrode and the white layer of the bus electrode), and the black stripes have sufficient blackness and insulation.

The photocuring composition according to the present embodiment includes two types of black particles (A) and (B), organic binder (C), photopolymerizable monomer (D), and photopolymerization initiator (E). The volume resistivity of black particles (A) is higher than that of black particles (B), and the average diameter of black particles (A) is smaller than that of black particles (B).

The photocuring composition may be either in the form of a paste, or in the form of a dry film produced in advance.

Furthermore, according to the present embodiment, the PDP is produced with a front substrate including black pattern structures formed by calcining the above-described photocuring composition.

By using the photocuring composition of the present embodiment to form both the black layer of the dual-layered bus electrode and the black stripes, sufficient conductivity between the white layer of the dual-layered bus electrode and the transparent electrode can be attained, and insulation between each pair of display electrodes positioned side by side can be also attained. In short, for bus electrodes, conductivity can be sufficiently achieved in a vertical line through white layer/black layer/transparent electrode. For the black stripes, parallel insulation can be sufficiently achieved between each pair of display electrodes positioned side by side.

As described above, since the photocuring composition provides insulating black stripes, and yet can achieve sufficient conductivity at the black layer of the dual-layered bus electrode, the composition is highly useful in mass-producing PDPs and lowering the production cost.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A photocuring composition comprising:
    a plurality of first black particles comprising at least one material selected from the group consisting of oxides of Al, Be, Ce, Cr, Hf, Mg, Si, Th, Ti, Zr and Co, and complex oxides of Al, Be, Ce, Cr, Hf, Mg, Si, Th, Ti, Zr and Co;
    a plurality of second black particles having a volume resistivity lower than a volume resistivity of the first black particles and an average diameter larger than an average diameter of the first black particles;
    an organic binder;
    a photopolymerizable monomer; and
    a photopolymerization initiator.

2. A photocuring composition according to claim 1, wherein the volume resistivity of the first black particles is in a range of $1.0 \times 10^6$ and $1.0 \times 10^{16}$ Ω·cm.

3. A photocuring composition according to claim 1, wherein the volume resistivity of the second black particles is in a range of $1.0 \times 10^{-6}$ and $1.0 \times 10^4$ Ω·cm.

4. A photocuring composition according to claim 1, wherein the average diameter of the first black particles is in a range of 0.3 and 0.01 μm.

5. A photocuring composition according to claim 1, wherein the average diameter of the second black particles is in a range of 0.6 and 2.0 μm.

6. A photocuring composition according to claim 1, wherein the first and second black particles have an L* value of 50 or less on an L*a*b* color system scale.

7. A photocuring composition according to claim 1, wherein the second black particles are in an amount between 10 and 120 parts by mass based on 100 parts by mass of the first black particles.

8. A photocuring composition according to claim 1, wherein the organic binder is in an amount between 10 and 80% by mass of a total mass of the photocuring composition.

9. A photocuring composition according to claim 1, wherein the photopolymerizable monomer is in an amount between 20 and 120 parts by mass based on 100 parts by mass of the organic binder.

10. A photocuring composition according to claim 1, wherein the photopolymerization initiator is in an amount between 1 and 30 parts by mass based on 100 parts by mass of the organic binder.

11. A photocuring composition according to claim 1, wherein the second black particles comprise at least one material selected from the group consisting of oxides and complex oxides of Cr, Fe, Ir, Mn, Mo, Nb, Os, Pt, Re, Rh, Ru, Ti, Cu, Ni, La, Sr, and Co.

12. A photocuring composition according to claim 1, further comprising a photosensitizer.

13. A photocuring composition according to claim 1, further comprising glass powder having a softening point in a range of 400 and 600° C.

14. A photocuring composition according to claim 13, wherein the glass powder is in an amount of 400 parts or less by mass, based on 100 parts by mass of the first black particles.

15. A photocuring composition according to claim 1, further comprising a stabilizer.

16. A photocuring composition according to claim 1, further comprising an antifoaming/leveling agent.

17. A photocuring composition according to claim 1, further comprising a silane coupling agent.

18. A photocuring composition according to claim 1, further comprising a pigment disperser.

19. A photocuring composition according to claim 1, further comprising an antioxidant.

20. A photocuring composition according to claim 1, further comprising an anti-thermal polymerization agent.

21. A black pattern structure for a plasma display panel, comprising:
   a calcined body produced by calcining a photocuring composition including a plurality of first black particles having a volume resistivity and an average diameter, a plurality of second black particles having a volume resistivity lower than the volume resistivity of the first black particles and an average diameter larger than the average diameter of the first black particles, an organic binder, a photopolymerizable monomer, and a photopolymerization initiator.

22. A black pattern structure according to claim 21, wherein the calcined body has a thickness between 0.3 and 2.0 μm.

23. A plasma display panel comprising:
   a substrate; and
   at least one black pattern structure formed on the substrate, the at least one black pattern structure comprising a calcined body produced by calcining a photocuring composition including a plurality of first black particles having a volume resistivity and an average diameter, a plurality of second black particles having a volume resistivity lower than the volume resistivity of the first black particles and an average diameter larger than the average diameter of the first black particles, an organic binder, a photopolymerizable monomer, and a photopolymerization initiator.

24. A plasma display panel according to claim 23, wherein the substrate has a transparent electrode provided thereon and a bus electrode provided on the transparent electrode, the bus electrode has a black layer and a white layer formed on the black layer, and the at least one black pattern structure comprises the black layer of the bus electrode and is configured to provide electrical conductivity between the transparent electrode and the white layer.

25. A plasma display panel according to claim 23, wherein the substrate has display electrodes provided thereon, and the at least one black pattern structure comprises a black stripe provided between the display electrodes and configured to insulate between the display electrodes.

26. A plasma display panel according to claim 23, wherein the at least one black pattern structure has a thickness between 0.3 and 2.0 μm.

27. A method of producing a black pattern structure for a plasma display panel, comprising:
   preparing a photocuring composition including a plurality of first black particles having a volume resistivity and an average diameter, a plurality of second black particles having a volume resistivity lower than the volume resistivity of the first black particles and an average diameter larger than the average diameter of the first black particles, an organic binder, a photopolymerizable monomer, and a photopolymerization initiator;
   forming a film comprising the photocuring composition on a substrate;
   subjecting the film to a light exposure through a patterned mask;
   developing the film to remove an unexposed portion of the film; and
   calcining the film to produce a patterned film.

28. A method according to claim 27, wherein the forming includes preparing the film comprising the photocuring composition and laminating the film on the substrate.

29. A method according to claim 27, wherein the forming includes coating a paste comprising the photocuring composition on the substrate and drying the paste to form the film.

30. A method according to claim 29, wherein the drying is conducted at a temperature in the range of 60 and 120° C.

31. A method according to claim 27, wherein the film is calcined at a temperature between 400 and 620° C.

32. A method according to claim 27, wherein the film is subjected to the light exposure between 50 and 1,000 mJ/cm$^2$.

33. A method of producing a plasma display panel, comprising:
   providing a substrate; and
   forming at least one black pattern structure on the substrate, the forming including preparing a photocuring composition including a plurality of first black particles having a volume resistivity and an average diameter, a plurality of second black particles having a volume resistivity lower than the volume resistivity of the first black particles and an average diameter larger than the average diameter of the first black particles, an organic binder, a photopolymerizable monomer, and a photopolymerization initiator, forming a film comprising the photocuring composition on the substrate, subjecting the film to a light exposure through a patterned mask, developing the film to remove an unexposed portion of the film, and calcining the film to produce a patterned film.

34. A method according to claim 33, wherein the film is calcined at a temperature between 400 and 620° C.

* * * * *